(12) United States Patent
Li et al.

(10) Patent No.: US 11,727,676 B2
(45) Date of Patent: Aug. 15, 2023

(54) FEATURE FUSION METHOD AND APPARATUS FOR IMAGE PROCESSING, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Yingying Li, Beijing (CN); Xiao Tan, Beijing (CN); Minyue Jiang, Beijing (CN); Hao Sun, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 87 days.

(21) Appl. No.: 17/213,746

(22) Filed: Mar. 26, 2021

(65) Prior Publication Data

US 2021/0232856 A1  Jul. 29, 2021

(30) Foreign Application Priority Data

Apr. 17, 2020 (CN) .......................... 202010309211.9

(51) Int. Cl.
*G06V 10/82* (2022.01)
*G06T 3/00* (2006.01)
(Continued)

(52) U.S. Cl.
CPC ............ *G06V 10/82* (2022.01); *G06F 18/211* (2023.01); *G06F 18/213* (2023.01);
(Continued)

(58) Field of Classification Search
CPC .... G06K 9/6232; G06K 9/6228; G06K 9/629; G06T 3/00; G06V 10/7715;
(Continued)

(56) References Cited

U.S. PATENT DOCUMENTS

| 2019/0163955 A1 | 5/2019 | Asif et al. |
| 2020/0074243 A1 | 3/2020 | Gu et al. |
| 2022/0230282 A1* | 7/2022 | Zhang .................. G06V 10/809 |

FOREIGN PATENT DOCUMENTS

| CN | 107942943 A | * | 4/2018 | ......... G05B 19/4086 |
| CN | 108229296 A | | 6/2018 | |

(Continued)

OTHER PUBLICATIONS

Office Action issued in corresponding JP Application No. 2021-049222 with English translation dated Apr. 5, 2022 (8 pages).

(Continued)

*Primary Examiner* — Casey L Kretzer
(74) *Attorney, Agent, or Firm* — Osha Bergman Watanabe & Burton LLP

(57) ABSTRACT

The present disclosure provides an image processing method. An image to be classified is input into a feature extraction model to generate N dimensional features. Dimension fusion is performed on M features of the N dimensional features to obtain M dimension fusion features. The image to be classified is processed based on M dimension fusion features and remaining features of the N dimensional features other than the M features.

12 Claims, 4 Drawing Sheets

(51) Int. Cl.
*G06V 10/77* (2022.01)
*G06V 10/80* (2022.01)
*G06F 18/213* (2023.01)
*G06F 18/211* (2023.01)
*G06F 18/25* (2023.01)

(52) U.S. Cl.
CPC .............. *G06F 18/253* (2023.01); *G06T 3/00* (2013.01); *G06V 10/7715* (2022.01); *G06V 10/806* (2022.01)

(58) Field of Classification Search
CPC .... G06V 10/806; G06V 10/82; G06F 18/211; G06F 18/213; G06F 18/253
See application file for complete search history.

(56) References Cited

FOREIGN PATENT DOCUMENTS

| CN | 108304847 A | | 7/2018 | |
|---|---|---|---|---|
| CN | 108596154 A | * | 9/2018 | ........... G06K 9/0063 |
| CN | 108830322 A | | 11/2018 | |
| CN | 109359696 A | | 2/2019 | |

OTHER PUBLICATIONS

Yamauchi Ryuke Qingye "By the combination of the color and the contour line and the DNN characteristic amoun" DEIM Forum 2019 A1-2 Information Intelligent Engineering Course of Toyohashi University of Technology, 1-1, Tianbo Town, Toyohashi City, Aichi Prefecture (13 pages).

Extended European Search Report issued in corresponding EP Application 21163339.1 dated Aug. 30, 2021 (9 pages).

Office Action issued in Chinese Application No. 202010309211.9, dated Mar. 11, 2023 (21 pages).

Feng et al.; "Convolutional Neural Network Based Multi-Band Ship Target Recognition with Feature Fusion;" Acta Optica Sinica; vol. 37; No. 10; Oct. 2017; pp. 1-9 (9 pages).

Lu et al.; "Feature Extraction and Fusion using Deep Convolutional Neural Networks for Face Detection;" (14 pages).

* cited by examiner

FEATURE FUSION METHOD AND APPARATUS FOR IMAGE PROCESSING, ELECTRONIC DEVICE AND STORAGE MEDIUM

CROSS REFERENCE TO RELATED APPLICATIONS

This application claims priority and benefits to Chinese Application No. 202010309211.9, filed on Apr. 17, 2020, the entire content of which is incorporated herein by reference.

TECHNICAL FIELD

The present disclosure relates to a field of image processing technologies, and more particularly, to a computer vision field.

BACKGROUND

Image classification network based on deep learning is fully developed. The existing image classification networks are used to extract image features mainly based on Convolutional Neural Networks (CNN) and learn based on the extracted image features.

SUMMARY

Embodiments of the disclosure provide an image processing method. The method includes: inputting an image into a feature extraction model to generate N dimensional features, N being a positive integer; performing dimension fusion on M features selected from the N dimensional features to obtain M dimension fusion features, M being a positive integer and less than or equal to N; and processing the image to be classified based on M dimension fusion features and remaining features of the N dimensional features other than the M features.

Embodiments of the disclosure provide an electronic device. The electronic device includes: at least one processor and a memory communicatively connected with the at least one processor. The memory stores instructions executable by the at least one processor, when the instructions are executed by the at least one processor, the at least one processor is configured to input an image into a feature extraction model to generate N dimensional features, N being a positive integer; perform dimension fusion on M features selected from the N dimensional features to obtain M dimension fusion features, M being a positive integer and less than or equal to N; and process the image based on M dimension fusion features and remaining features of the N dimensional features other than the M features.

Embodiments of the disclosure provide a non-transitory computer-readable storage medium, having computer instructions stored thereon. The computer instructions are used to make the computer execute the image processing method. The method includes inputting an image into a feature extraction model to generate N dimensional features, N being a positive integer; performing dimension fusion on M features selected from the N dimensional features to obtain M dimension fusion features, M being a positive integer and less than or equal to N; and processing the image to be classified based on M dimension fusion features and remaining features of the N dimensional features other than the M features.

It should be understood, the content described in this section is not intended to identify key or important features of the embodiments of the present disclosure, nor is it intended to limit the scope of the present disclosure. Additional features of the present disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

Figure 1:
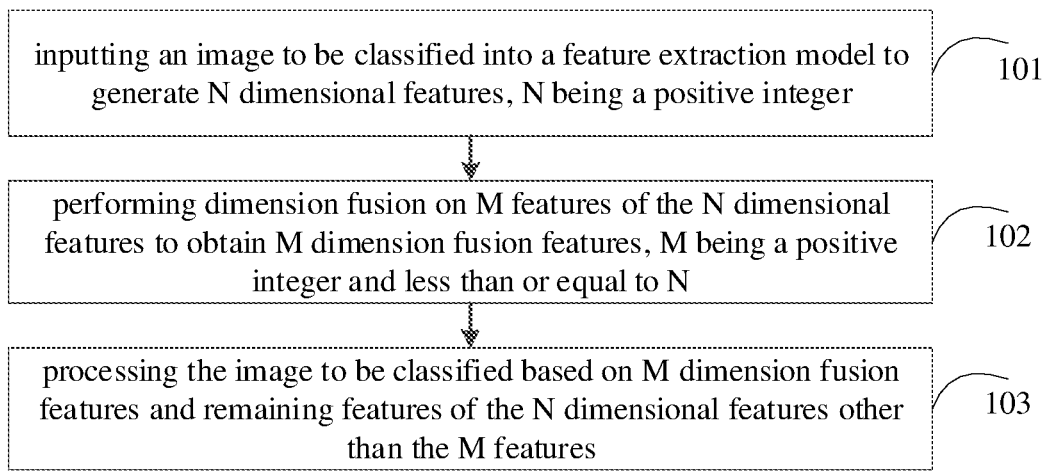
FIG. 1 is a flowchart illustrating an image processing method according to some embodiments of the present disclosure.

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

An image processing method, an image processing apparatus, an electronic device and a storage medium according to the disclosure will be described with reference to the attached drawings.

Existing image classification network based on deep learning extracts image features mainly based on CNN combined with components such as fully connected layers, and uses softmax multi-class classifier and multi-class cross-entropy loss function to learn, in order to obtain a network model for image processing.

However, most of existing network structure designs focus on feature extraction and fusion on the image space. For example, high-resolution network (HRNet) proposes a feature fusion scheme that maintains the spatial resolution. The EfficientNet network designs different network depths and widths for feature extraction based on images having different resolutions. The deep residual network (ResNet), proposes a skip connection structure to make the network deeper and better extract feature information. The deep layer aggregation (DLA) network realizes the feature fusion between different convolution blocks and different depths. The convolution operation of the above network structure designs can all perform the feature extraction and fusion on one dimension of the image space, which ignores the relationship between features of different dimensions, resulting in poor learning effect of the network and low accuracy, and thus the accuracy of image processing is not high.

In view of the above problems, this disclosure provides an image processing method. According to the method, an image to be classified is input into a feature extraction model to generate features of N dimensions, and dimension fusion is performed on M features among the features of N dimensions to obtain M dimensional fusion features, M is a positive integer less than or equal to N. Image processing is performed based on the remaining unfused features among the features of N dimensions other than the selected M features and on the M dimensional fusion features. Therefore, in the image processing, not only the spatial features of the image are extracted, but also the relationships between the features of different dimensions are taken into consideration. The dimensional fusion features of spatial features of different dimensions are extracted, thereby improving the learning effect and the accuracy of image processing. An image to be classified is input into a feature extraction model to generate N dimensional features.

FIG. 1 is a flowchart illustrating an image processing method according to some embodiments of the present disclosure. This method may be executed by the image processing apparatus according to this disclosure, or by an electronic device. The electronic device may be a server, or a terminal device such as a desktop computer or a notebook computer, which is not limited in this disclosure. The disclosure is described by taking the image processing apparatus to execute the image processing method of the disclosure as an example.

As illustrated in FIG. 1, the image processing method may include the following.

At block 101, an image to be classified is input into a feature extraction model to generate N dimensional features, where N is a positive integer.

In this disclosure, when classifying, detecting, and dividing objects contained in the image, the image to be processed is input into a corresponding feature extraction model. For example, when classifying the objects contained in the image, the image to be classified is input into the feature extraction model that is used to classify objects contained in the image, for image classification.

The feature extraction model may be any image classification network, such as HRNet, ResNet and EfficientNet.

Generally, each kind of image classification network has multiple convolutional layers which are used to convolute the input image on the feature map, for feature extraction and fusion. Outputs of the convolutional layers are spatial features of the input image. Therefore, in embodiments of the disclosure, the image to be classified may be input into the image classification network to generate multiple spatial features. The number of the generated spatial features may be represented by N, where N is a positive integer. That is, in the disclosure, the image to be classified may be input into the image classification network to generate N dimensional features (e.g., the N dimensional features are N features each corresponding to one of multiple dimensions). The value of N is related to the number of convolutional layers in the image classification network. The N dimensional features refer to the spatial features of the feature map corresponding to the image to be classified on the spatial dimension.

At block 102, dimension fusion is performed on M features selected from the N dimensional features to obtain M dimension fusion features, where M is a positive integer and less than or equal to N.

In some embodiments, after obtaining the N dimensional features of the image to be classified, the dimension fusion is performed on the M features of the N dimensional features to obtain M dimension fusion features, where M is a positive integer and less than or equal to N. The M features may be selected randomly from the N dimensional features, or continuous M features may be selected from the N dimensional features. In some examples, some features may be selected from an upper convolutional layer and some features may be selected from a lower convolutional layer to obtain total M features, which is not limited in the disclosure.

The dimension fusion may be performed on each of the M features. In detail, for each feature, the dimensional fusion feature corresponding to the feature may be obtained by performing the multi-times convolution and fusion operations on the feature on the dimension space based on a preset size of the convolution kernel and a preset channel number.

It should be noted, performing the dimension fusion on the M features to obtain the M dimension fusion features will be described in detail below, which is not repeated here.

At block 103, the image to be classified is processed based on the M dimension fusion features and remaining features of the N dimensional features other than the M features.

In some embodiments, after the dimension fusion is performed on the M features to obtain the M dimension fusion features, the image processing may be performed based on the remaining dimensional features (i.e., (N-M) dimensional features) and the M dimension fusion features that are obtained after performing the dimension fusion, to achieve the processing operations such as classification and detection of the image to be classified.

In some embodiments, the image processing includes, but is not limited to, any one of image classifying, image dividing and image detecting. That is, the image processing method according to the disclosure may be suitable to various image processing tasks such as classification, division, and detection, with strong flexibility and wide application range.

When the image processing is the image classification, the image to be classified is input into the feature extraction model to generate the N dimensional features. The dimension fusion is performed on some or all of the N features to obtain the dimensional fusion features. The image to be classified is classified based on the M dimension fusion features and the remaining features of the N dimensional features other than the M features to achieve the image classification. Since the dimensional fusion features are obtained by convoluting and fusing features on the dimension space, the relationship between features of different dimensions may be also considered, instead of only performing the feature extraction and the feature fusion on the image space of the feature map. Thus, the dimensional fusion features and remaining features are adopted for the image classification, thereby improving the learning ability and learning effect of image features, and improving the accuracy of the image classification.

With the image processing method according to embodiments of the disclosure, the image to be classified is input into the feature extraction model to generate the N dimensional features, where N is a positive integer. The dimension fusion is performed on the M features selected from the N dimensional features to obtain the M dimension fusion features, where M is a positive integer and less than or equal to N. The image to be classified is processed based on the M dimension fusion features and remaining features of the N dimensional features other than the M features. In the image processing, not only the spatial features of the image are extracted, but also the relationship between the features of different dimensions is considered, and the dimensional fusion features of the spatial features among different dimensions are extracted, thereby improving the learning effect and the image processing accuracy.

In order to clearly describe performing the dimension fusion on the M features selected from the N dimensional features to obtain the M dimension fusion features, detailed descriptions are given below with reference to FIG. 2.

Figure 2:
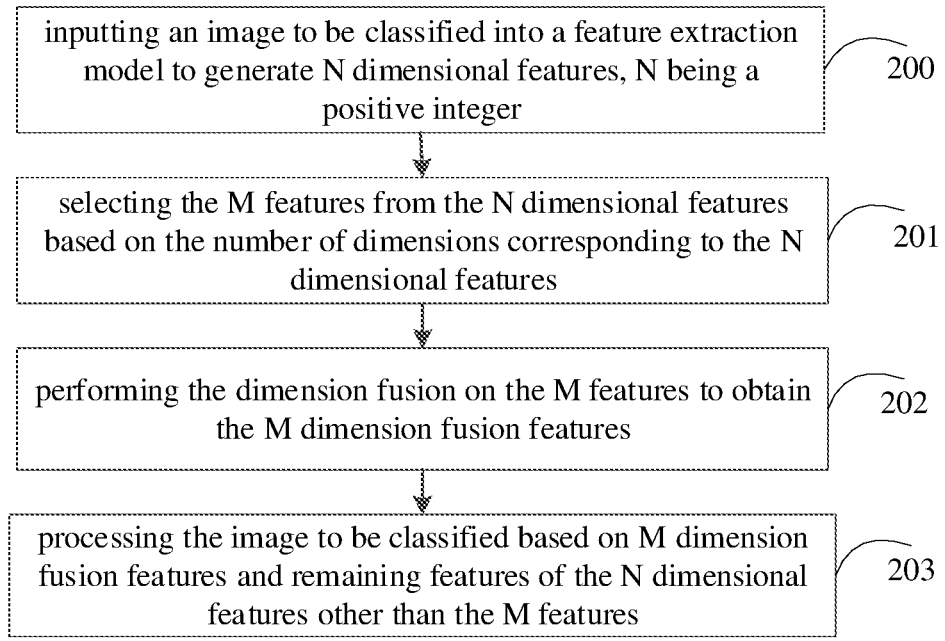
FIG. 2 is a flowchart illustrating an image processing method according to some embodiments of the present disclosure.

FIG. 2 is a flowchart illustrating an image processing method according to some embodiments of the present disclosure. As illustrated in FIG. 2, the method may include the following.

At block 200, an image to be classified is input into a feature extraction model to generate N dimensional features, where N is a positive integer.

Descriptions of the block 200 may refer to those of block 101 described above.

At block 201, the M features are selected from the N dimensional features based on the number of dimensions corresponding to the N dimensional features.

In some embodiments, when selecting the M features to be performed with the dimension fusion, the selection may be made based on the number of dimensions corresponding to the N dimensional features. The number of dimensions mentioned here refers to the number of convolutional layers for outputting the N dimensional features.

For example, the feature extraction model may be the ResNet. The ResNet includes 5 convolutional layers (e.g., conv1, conv2_x, conv3_x, conv4_x, and conv5_x), and a fully connected layer (e.g., fc layer for classification). Since the network includes 5 convolutional layers, the number of dimensions corresponding to the N dimensional features generated by ResNet is 5.

In some embodiments, when the M features are selected based on the number of dimensions corresponding to the N dimensional features, different methods may be used for selecting the M features according to different task features and data. The method of selecting the M features is not limited in the present disclosure.

As a possible implementation, it is possible to select the M features from high-level features of the N features, such that M high-level features are selected from the N features. Generally, low-level features learn more detailed information, while high-level features learn more semantic information. For the image classification, semantic information is generally needed to determine which category the image belongs to. Therefore, when the image processing is the image classifying, M high-level features may be selected for the dimension fusion. For the ResNet, the features output by the conv3_x, the conv4_x, and the conv5_x may be finally determined as the M features to ensure that more semantic information is learned when the dimension fusion is performed on M features, thereby improving the accuracy of the image classification.

As a possible implementation, the N features may be divided into a first dimension range of features and a second dimension range of features based on the number of dimensions corresponding to the N features. The second dimension range is larger than the first dimension range. Total M features are selected from the first dimension range of features and the second dimension range of features. That is, in this implementation, the N features are divided into a low-level feature range (that is, the first dimension range) of features and a high-level feature range (that is, the second dimension range) of features. The total M features are selected from the low-level feature range and the high-level feature range of features. For the ResNet, suppose that features output by the conv1 and the conv2_x are features of the low-level feature range, and features output by the conv3_x, the conv4_x, and the conv5_x are features of the high-level feature range, the features output by the conv1, the conv4_x, and the conv5_x, may be finally selected as the M features. Therefore, both the low-level features and the high-level features are selected, ensuring that high-level and low-level information are combined when the dimension fusion is performed on M features, which is conducive to the implementation of fine-grained recognition tasks and improves the accuracy of image detail feature recognition.

At block 202, the dimension fusion is performed on the M features to obtain the M dimension fusion features.

In some embodiments, after extracting M features from N dimensional features, the dimension fusion is performed on the M features to obtain the M dimension fusion features.

In detail, performing the dimension fusion of the M features may include transforming the M features into M dimensional features, and convoluting the M dimensional features to obtain M dimensional fusion features.

Transforming the M features into the M dimensional features means exchanging between the number of dimensions of the feature map and the size of the feature map for each of the M features. The feature obtained after the transformation is called dimensional feature.

For the ResNet101, the feature output by the conv3_x is (512, 28*28), the feature output by the conv4_x is (1024, 14*14), and the feature output by the conv5_x is (2048, 7*7), where 512, 1024, and 2048 are numbers of dimensions of the feature maps, and 28*28, 14*14, and 7*7 are sizes of the feature maps. For example, the selected M features for the dimension fusion are (512, 28*28), (1024, 14*14) and (2048, 7*7), and the transforming is performed on each selected feature to obtain the corresponding dimensional features, i.e., (28*28, 512), (14*14, 1024) and (7*7, 2048).

Through the transformation, the conversion between the feature map space and the dimension space is realized, providing the foundation for performing subsequent convolution operations on the dimension space to achieve feature extraction and fusion on the dimension space.

At block 203, the image to be classified is processed based on the M dimension fusion features and remaining features of the N dimensional features other than the M features.

Descriptions of the block 203 may refer to those of block 103 described above.

Next, after transforming the M features into the M dimensional features, the convolution may be performed on the M dimensional features to obtain M dimension fusion features. Obtaining the M dimension fusion features may be described in detail below in combination with FIG. 3.

Figure 3:
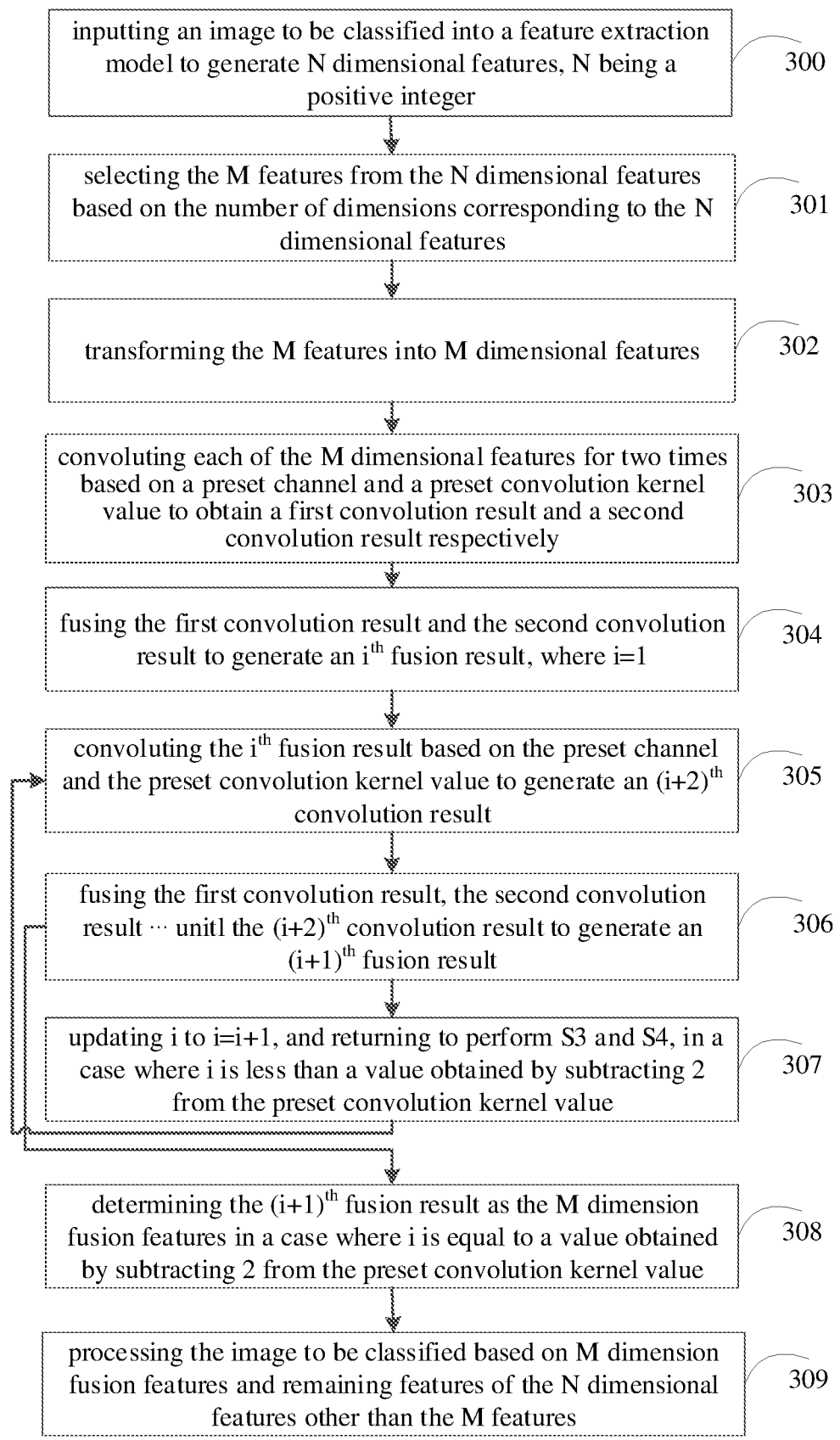
FIG. 3 is a flowchart illustrating an image processing method according to some embodiments of the present disclosure.

FIG. 3 is a flowchart illustrating a method for processing an image according to some embodiments of the present disclosure. As illustrated in FIG. 3, the method include the following.

At block 300, an image to be classified is input into a feature extraction model to generate N dimensional features, where N is a positive integer.

At block 301, the M features are selected from the N dimensional features based on the number of dimensions corresponding to the N dimensional features.

Descriptions of the blocks 300 and 301 may refer to those of blocks 200 and 201 described above.

At block 302, the M features are transformed into M dimensional features.

Transforming the M features into the M dimensional features means exchanging between the number of dimensions of the feature map and the size of the feature map for each of the M features. The feature obtained after the transformation is called dimensional feature.

At block 303, for each of the M dimensional features, the dimensional feature is convoluted for two times based on a preset channel and a preset convolution kernel value to obtain a first convolution result and a second convolution result respectively.

The preset channel and the preset convolution kernel value may be set according to task requirements, to realize flexible setting of channels and convolution kernel values and to improve the flexibility and applicability of the method.

For example, the channel and the convolution kernel value used for the first convolution may be the same with those used for the second convolution.

At block 304, the first convolution result and the second convolution result are fused to generate an $i^{th}$ fusion result, where i=1.

At block 305, the $i^{th}$ fusion result is convoluted based on the preset channel and the preset convolution kernel value to generate an $(i+2)^{th}$ convolution result.

In some examples, the channel and the convolution kernel value used for convoluting the ith fusion result may be the same with those used for the first convolution and the second convolution.

At block 306, the first convolution result, the second convolution result . . . until the $(i+2)^{th}$ convolution result are fused to generate an $(i+1)^{th}$ fusion result.

At block 307, i is updated to i=i+1, and the blocks 305 and 306 are performed, in a case where i is less than a value obtained by subtracting 2 from the preset convolution kernel value.

At block 308, the $(i+1)^{th}$ fusion result is determined as one of the M dimension fusion features in a case where i is equal to a value obtained by subtracting 2 from the preset convolution kernel value.

In some embodiment, when the M dimensional features are convoluted to obtain the M dimensional fusion features, the number of times of performing the convolution operations and the number of times of performing the fusion operations are related to the preset convolution kernel value. In order to obtain better learning effect, the preset convolution kernel value may be set to be not less than 3. The number of times of performing the convolution operations for generating the dimensional fusion features is the same with the preset convolution kernel value, and the number of times of performing the fusion operations is a value obtained by subtracting 1 from the preset convolution kernel value.

For example, the feature is convolved with (5, 4*4), where 5 refers to the channel, 4*4 refers to the size of the convolution kernel. For each of the M dimensional features, for example the dimensional feature (28*28, 512), the dimensional feature is convoluted twice according to the preset channel and the convolution kernel to obtain the first convolution result and the second convolution result, both of which are (5, 512). The two convolution results are combined to obtain a first fusion result (10, 512). The first fusion result is convolved once according to the preset channel and the convolution kernel value, to obtain the third convolution result (5, 512). The first convolution result, the second convolution result and the third convolution result are fused to obtain a second fusion result (15, 512). At this time, i=1 which is less than 2 which is obtained by subtracting 2 from the preset convolution kernel value, and the value of i is updated to i=i+1=2. In addition, the second fusion result is convolved once according to the preset channel and the convolution kernel value to generate a fourth convolution result (5, 512), and the first, the second, the third and the four convolution results are fused to obtain the third fusion result (20, 512). At this time, i=2, which is equal to 2 which is obtained by subtracting 2 from the preset convolution kernel value. Therefore, the third fusion result (20, 512) is determined as a dimension fusion feature obtained by performing the dimension fusion on the dimensional feature (28*28, 512).

It should be noted, when the preset convolution kernel value is not less than 3, the above implementation process may be used to obtain the M dimension fusion features corresponding to the M dimensional features. When the preset convolution kernel value is 1, only one-times convolution is required to be performed on each dimensional feature (each dimensional feature is convoluted once) and no fusion operation is required, to obtain a convolution result which is the dimension fusion feature. When the preset convolution kernel value is 2, for each dimensional feature, two-times convolutions are performed on each dimensional feature (each dimensional feature is convoluted twice) to obtain two convolution results, and the two convolution results are fused to obtain a fusion result. The fusion result is determined as the dimension fusion feature corresponding to the dimensional feature.

The M dimensional features are convolved according to the preset channel and the preset convolution kernel value to obtain the M dimension fusion features. Therefore, the dimensional features are fully extracted and fused, and the relationship between the dimensions is fully learned, which is conducive to improving the effect of image processing.

At block 309, the image to be classified is processed based on the M dimension fusion features and remaining features of the N dimensional features other than the M features.

Descriptions of the block 309 may refer to those of block 103 described above.

In the method according to embodiments of the present disclosure, the M features are selected from the N dimensional features according to the number of dimensions corresponding to the N dimensional features, and dimension fusion is performed on the M dimensional fusion features to obtain the M dimension fusion features. Therefore, the method is conducive to selecting features to perform the dimension fusion according to actual task requirements, such that the flexibility and applicability of the method are improved. In addition, the dimensional fusion features are obtained through the dimension fusion of features, the relationship between different dimensions is fully learned, and learning effect and the accuracy of image processing are improved.

In practical applications, the method according to the present disclosure is applied for training the network model, and dimension feature learning is added to the existing network model to improve learning ability of the model and enhance the model effect. The trained model is reused for the image processing, such as image classifying, image dividing, and image detecting, to improve the accuracy of the image processing.

For the ResNet101, the feature output by the conv3_x is (512, 28*28), the feature output by the conv4_x is (1024, 14*14), and the feature output by the conv5_x is (2048, 7*7). The dimension fusion is performed on the three features. Take the conv3_x as an example, (512, 28*28) is converted to (28*28, 512). Taking the convolution of (4, 3*3) as an example, twice convolutions are performed respectively, to obtain two features, both of which are (4, 512). and the two features are combined to obtain (8, 512,) and (8, 512,) is convolved once to obtain (4, 512). Three convolution results (4, 512) are fused to obtain a dimension fusion feature (12, 512). The feature extraction and fusion described in the above process are performed on the features output by the conv3_x, the conv4_x, and the conv5_x respectively, to obtain the corresponding dimension fusion features, i.e., (12, 512), (12, 1024), and (12, 2048), respectively. Further, the dimension fusion features obtained by the feature extraction and fusion of the features output by the three layers are respectively sent to the fully connected layer. The model is trained in combination with the loss function. After multiple iterations, a trained network model is obtained. The model training process may refer to existing technologies in the field of deep learning, which is not described in detail here. In the prediction process, the outputs of the three branches are simply fused, such as summing the outputs of the three branches or performing a weighted summation, to obtain the final processing result.

Further, by inputting the image to be processed into the trained model, accurate processing results may be obtained. Since the trained model not only extracts the spatial features of the image, but also fully learns the relationship between the feature dimensions, the model learning effect is good. Therefore, using the trained model for the image processing may improve the accuracy of image processing.

In order to implement the above embodiments, this disclosure provides an image processing apparatus.

Figure 4:
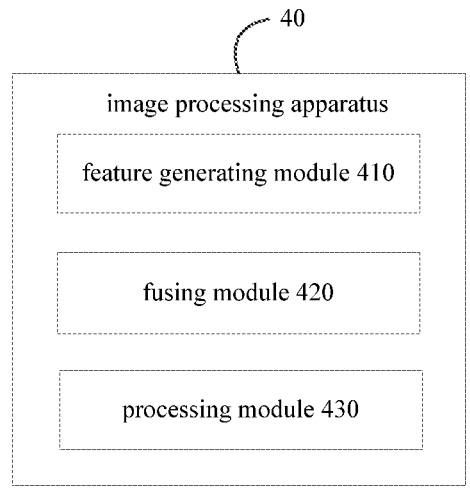
FIG. 4 is a schematic diagram illustrating an image processing apparatus according to some embodiments of the present disclosure.

FIG. 4 is a schematic diagram of an image processing apparatus according to Embodiment 4 of the present disclosure. As illustrated in FIG. 4, the image processing apparatus 40 includes: a feature generating module 410, a fusing module 420 and a processing module 430.

The feature generating module 410 is configured to input an image to be classified into a feature extraction model to generate N dimensional features, and N is a positive integer.

The fusing module 420 is configured to perform dimension fusion on M features of the N dimensional features to obtain M dimension fusion features, M is a positive integer and less than or equal to N.

The processing module 430 is configured to process the image to be classified based on M dimension fusion features and remaining features of the N dimensional features other than the M features.

Image processing includes but is not limited to any of image processing operations such as image classifying, image segmenting, or image detecting.

Figure 5:
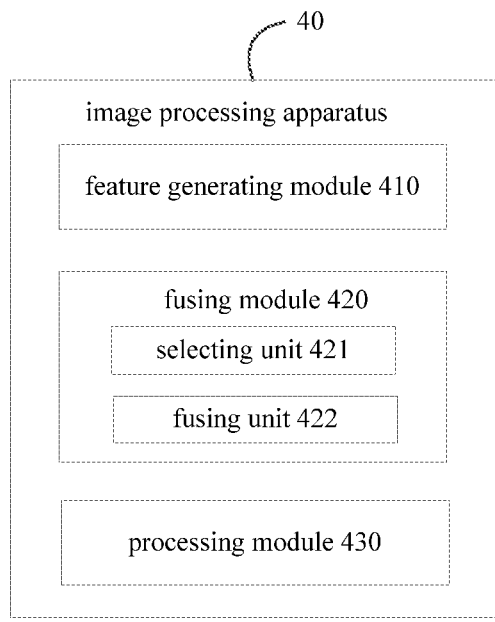
FIG. 5 is a schematic diagram illustrating an image processing apparatus according to some embodiments of the present disclosure.

In a possible implementation, as illustrated in FIG. 5, on the basis of FIG. 4, the fusing module 420 includes: a selecting unit 421, configured to select the M features from the N dimensional features based on the number of dimensions corresponding to the N dimensional features.

In a possible implementation, the selecting unit 421 is configured to: select the M features from a first dimension range and a second dimension range of the N dimensional features, the second dimension range being larger than the first dimension range.

By selecting M features from the first dimension range and the second dimension range, the second dimension range is larger than the first dimension range. Therefore, both low-level features and high-level features are selected, it is ensured that high-level and low-level information are combined when dimension fusion is performed on M features, which is conducive to completion of fine-grained recognition tasks, the accuracy of image detail feature recognition is ensured.

The fusing unit 422 is configured to perform the dimension fusion on the M features to obtain the M dimension fusion features.

Figure 6:
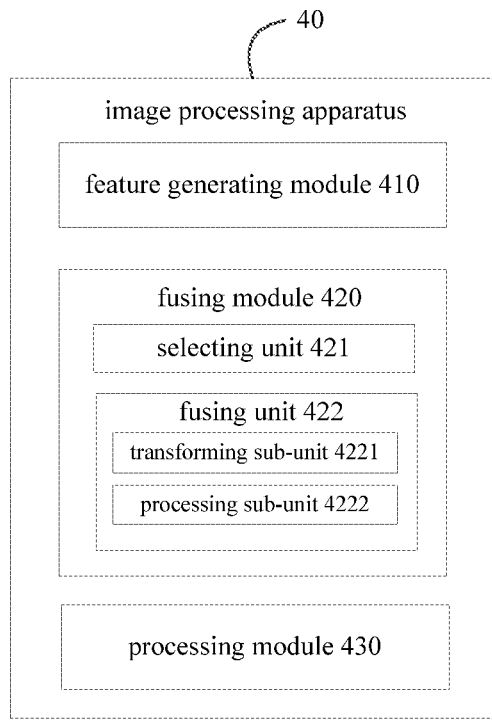
FIG. 6 is a schematic diagram illustrating an image processing apparatus according to some embodiments of the present disclosure.

In a possible implementation, as illustrated in FIG. 6, on the basis of FIG. 5, the fusing unit 422 includes: a transforming sub-unit 4221 and a processing sub-unit 4222.

The transforming sub-unit 4221 is configured to transform the M features to generate M dimensional features.

The processing sub-unit 4222 is configured to convolute the M dimensional features to obtain the M dimension fusion features.

In an embodiment, the processing sub-unit 4222 is further configured to:

S1, convolute each of the M dimensional features for two times based on a preset channel and a preset convolution kernel value to obtain a first convolution result and a second convolution result respectively;

S2, fuse the first convolution result and the second convolution result to generate an $i^{th}$ fusion result, where i=1;

S3: convolute the $i^{th}$ fusion result based on the preset channel and the preset convolution kernel value to generate an $(i+2)^{th}$ convolution result;

S4, fuse the first convolution result, the second convolution result . . . until the $(i+2)^{th}$ convolution result to generate an $(i+1)^{th}$ fusion result;

S5, update i to i=i+1, and return to perform S3 and S4, in a case where i is less than a value obtained by subtracting 2 from the preset convolution kernel value; and S6: determine the $(i+1)^{th}$ fusion result as the M dimension fusion features in a case where i is equal to a value obtained by subtracting 2 from the preset convolution kernel value.

It should be noted that when the preset convolution kernel value is equal to or greater than 3, the processing subunit 4222 performs the above processing operations to obtain M dimension fusion features corresponding to M dimensional features. When the preset convolution kernel value is 1, the processing subunit 4222 only needs to perform convolution on the M dimensional features once, without fusion, and the obtained convolution result is the dimension fusion features. When the preset convolution kernel value is 2, for each dimensional feature, the processing subunit 4222 performs convolution on the dimensional features twice to obtain two convolution results, and then the two convolution results are combined to obtain a fusion result, and the fusion result is the dimension fusion feature corresponding to the dimensional feature.

By convolving the M dimensional features according to the preset channel and the preset convolution kernel value to obtain M dimension fusion features, the dimensional features are fully extracted and fused, and the relationship between the dimensions is fully learned, which is conducive to improving the effect of image processing.

With the image processing apparatus of the embodiments of the present disclosure, an image to be classified is input into a feature extraction model to generate N dimensional features, N is a positive integer. Dimension fusion is performed on M features of the N dimensional features to obtain M dimension fusion features, M is a positive integer and less than or equal to N. The image to be classified is processed based on M dimension fusion features and remaining features of the N dimensional features other than the M features. During image processing, not only the spatial features of the image are extracted, but also the relationship between the different dimension features is considered, and the dimensional fusion features between the different dimensions of each spatial feature are extracted, which improves the learning effect and improves the image processing accuracy.

According to the embodiments of the present disclosure, the disclosure also provides an electronic device and a non-transitory computer-readable storage medium.

Figure 7:
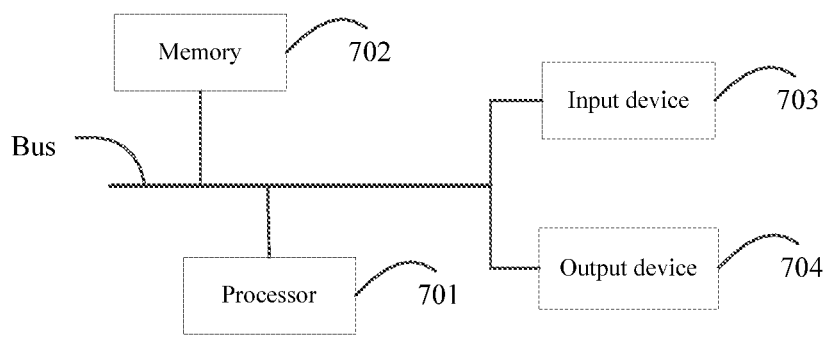
FIG. 7 is a block diagram illustrating an electronic device used to implement the image processing method according to some embodiments of the present disclosure.

FIG. 7 is a block diagram of an electronic device used to implement the method according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 7, the electronic device includes: one or more processors 701, a memory 702, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 701 is taken as an example in FIG. 7.

The memory 702 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 702 is configured to store non-transitory software programs, non-transitory computer executable programs and modules, such as program instructions/modules (for example, the feature generating module 410, the fusion module 420, and the processing module 430 shown in FIG. 4) corresponding to the method in the embodiment of the present disclosure. The processor 701 executes various functional applications and data processing of the server by running non-transitory software programs, instructions, and modules stored in the memory 702, that is, implementing the method in the foregoing method embodiments.

The memory 702 may include a storage program area and a storage data area, where the storage program area may store an operating system and application programs required for at least one function. The storage data area may store data created according to the use of the electronic device for implementing the method. In addition, the memory 702 may include a high-speed random access memory, and a non-transitory memory, such as at least one magnetic disk storage device, a flash memory device, or other non-transitory solid-state storage device. In some embodiments, the memory 702 may optionally include a memory remotely disposed with respect to the processor 701, and these remote memories may be connected to the electronic device for implementing the method through a network. Examples of the above network include, but are not limited to, the Internet, an intranet, a local area network, a mobile communication network, and combinations thereof.

The electronic device for implementing the method may further include: an input device 703 and an output device 704. The processor 701, the memory 702, the input device 703, and the output device 704 may be connected through a bus or in other manners. In FIG. 7, the connection through the bus is taken as an example.

The input device 703 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 704 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

According to the technical solution of the embodiments of the present disclosure, an image to be classified is input into a feature extraction model to generate N dimensional features, N is a positive integer. Dimension fusion is performed on M features of the N dimensional features to obtain M dimension fusion features, M is a positive integer and less than or equal to N. The image to be classified is processed based on M dimension fusion features and remaining features of the N dimensional features other than the M features. During image processing, not only the spatial features of the image are extracted, but also the relationship between the different dimension features is considered, and the dimensional fusion features between the different dimensions of each spatial feature are extracted, which improves the learning effect and improves the image processing accuracy.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. An image processing method, comprising:
   inputting an image into a feature extraction model to generate N dimensional features, N being a positive integer, and the N dimensional features being N features each corresponding to one of multiple dimensions;
   performing dimension fusion on M features selected from the N dimensional features to obtain M dimension fusion features, M being a positive integer and less than or equal to N; and
   processing the image based on M dimension fusion features and remaining features of the N dimensional features other than the M features,
   wherein performing the dimension fusion on the M features selected from the N dimensional features to obtain the M dimension fusion features comprises:
   selecting the M features from the N dimensional features based on the number of dimensions corresponding to the N dimensional features;
   generating M dimensional features by transforming the M features from a feature map space to a dimension space; and
   convoluting and fusing the M dimensional features to obtain the M dimension fusion features.

2. The method according to claim 1, wherein the selecting the M features from the N dimensional features based on the number of dimensions corresponding to the N dimensional features comprises:
   selecting the M features from a first dimension range and a second dimension range of the N dimensional features, the second dimension range being larger than the first dimension range.

3. The method according to claim 1, wherein convoluting and fusing the M dimensional features to obtain the M dimension fusion features comprises:
   S1, convoluting each of the M dimensional features for two times based on a preset channel and a preset convolution kernel value to obtain a first convolution result and a second convolution result respectively;
   S2, fusing the first convolution result and the second convolution result to generate an $i^{th}$ fusion result, where i=1;
   S3: convoluting the $i^{th}$ fusion result based on the preset channel and the preset convolution kernel value to generate an $(i+2)^{th}$ convolution result;
   S4, fusing the first convolution result, the second convolution result . . . until the $(i+2)^{th}$ convolution result to generate an $(i+1)^{th}$ fusion result;
   S5, updating i to i=i+1, and returning to perform S3 and S4, in a case where i is less than a value obtained by subtracting 2 from the preset convolution kernel value; and
   S6: determining the $(i+1)^{th}$ fusion result as each of the M dimension fusion features in a case where i is equal to a value obtained by subtracting 2 from the preset convolution kernel value.

4. The method according to claim 1, wherein processing the image comprises image classifying, image dividing or image detecting.

5. An electronic device, comprising:
   at least one processor; and
   a memory communicatively connected with the at least one processor; wherein,
   the memory is configured to store instructions executable by the at least one processor, when the instructions are executed by the at least one processor, the at least one processor is configured to:
   input an image into a feature extraction model to generate N dimensional features, N being a positive integer, and the N dimensional features being N features each corresponding to one of multiple dimensions;
   perform dimension fusion on M features selected from the N dimensional features to obtain M dimension fusion features, M being a positive integer and less than or equal to N; and process the image based on M dimension fusion features and remaining features of the N dimensional features other than the M features, wherein the at least one processor is further configured to:

select the M features from the N dimensional features based on the number of dimensions corresponding to the N dimensional features;

generate M dimensional features by transforming the M features from a feature map space to a dimension space; and convolute and fuse the M dimensional features to obtain the M dimension fusion features.

6. The electronic device according to claim 5, wherein the at least one processor is further configured to:

select the M features from a first dimension range and a second dimension range of the N dimensional features, the second dimension range being larger than the first dimension range.

7. The electronic device according to claim 5, wherein the at least one processor is further configured to:

S1, convolute each of the M dimensional features for two times based on a preset channel and a preset convolution kernel value to obtain a first convolution result and a second convolution result respectively;

S2, fuse the first convolution result and the second convolution result to generate an $i^{th}$ fusion result, where i=1;

S3: convolute the $i^{th}$ fusion result based on the preset channel and the preset convolution kernel value to generate an $(i+2)^{th}$ convolution result;

S4, fuse the first convolution result, the second convolution result . . . until the $(i+2)^{th}$ convolution result to generate an $(i+1)^{th}$ fusion result;

S5, update i to i=i+1, and returning to perform S3 and S4, in a case where i is less than a value obtained by subtracting 2 from the preset convolution kernel value; and S6: determine the $(i+1)^{th}$ fusion result as each of the M dimension fusion features in a case where i is equal to a value obtained by subtracting 2 from the preset convolution kernel value.

8. The electronic device according to claim 5, wherein processing the image comprises image classifying, image dividing or image detecting.

9. A non-transitory computer-readable storage medium having computer instructions stored thereon, wherein the computer instructions are used to make the computer to execute an image processing method, the method comprising:

inputting an image into a feature extraction model to generate N dimensional features, N being a positive integer, and the N dimensional features being N features each corresponding to one of multiple dimensions;

performing dimension fusion on M features selected from the N dimensional features to obtain M dimension fusion features, M being a positive integer and less than or equal to N; and processing the image based on M dimension fusion features and remaining features of the N dimensional features other than the M features, wherein performing the dimension fusion on the M features selected from the N dimensional features to obtain the M dimension fusion features comprises:

selecting the M features from the N dimensional features based on the number of dimensions corresponding to the N dimensional features;

generating M dimensional features by transforming the M features from a feature map space to a dimension space; and convoluting and fusing the M dimensional features to obtain the M dimension fusion features.

10. The non-transitory computer-readable storage medium according to claim 9, wherein the selecting the M features from the N dimensional features based on the number of dimensions corresponding to the N dimensional features comprises:

selecting the M features from a first dimension range and a second dimension range of the N dimensional features, the second dimension range being larger than the first dimension range.

11. The non-transitory computer-readable storage medium according to claim 9, wherein convoluting and fusing the M dimensional features to obtain the M dimension fusion features comprises:

S1, convoluting each of the M dimensional features for two times based on a preset channel and a preset convolution kernel value to obtain a first convolution result and a second convolution result respectively;

S2, fusing the first convolution result and the second convolution result to generate an $i^{th}$ fusion result, where i=1;

S3: convoluting the $i^{th}$ fusion result based on the preset channel and the preset convolution kernel value to generate an $(i+2)^{th}$ convolution result;

S4, fusing the first convolution result, the second convolution result . . . until the $(i+2)^{th}$ convolution result to generate an $(i+1)^{th}$ fusion result;

S5, updating i to i=i+1, and returning to perform S3 and S4, in a case where i is less than a value obtained by subtracting 2 from the preset convolution kernel value; and S6: determining the $(i+1)^{th}$ fusion result as each of the M dimension fusion features in a case where i is equal to a value obtained by subtracting 2 from the preset convolution kernel value.

12. The non-transitory computer-readable storage medium according to claim 9, wherein processing the image comprises image classifying, image dividing or image detecting.

* * * * *